United States Patent
Angel et al.

(10) Patent No.: US 10,207,379 B2
(45) Date of Patent: Feb. 19, 2019

(54) LIVE TOOL COLLAR HAVING WIRELESS SENSOR

(71) Applicant: Colibri Spindles Ltd., Lavon Industrial Park (IL)

(72) Inventors: Avigdor Angel, Akko (IL); Ran Benedik, Karmiel (IL)

(73) Assignee: Colibri Spindles Ltd., Lavon Industrial Park (IL)

( * ) Notice: Subject to any disclaimer, the term of this patent is extended or adjusted under 35 U.S.C. 154(b) by 94 days.

(21) Appl. No.: 15/410,218

(22) Filed: Jan. 19, 2017

(65) Prior Publication Data

US 2017/0209974 A1 Jul. 27, 2017

Related U.S. Application Data

(60) Provisional application No. 62/281,431, filed on Jan. 21, 2016.

(51) Int. Cl.
| | |
|---|---|
| *B23Q 17/12* | (2006.01) |
| *B23Q 17/09* | (2006.01) |
| *B23Q 17/00* | (2006.01) |
| *B23Q 5/06* | (2006.01) |
| *B23B 31/20* | (2006.01) |

(Continued)

(52) U.S. Cl.
CPC .......... *B23Q 17/0985* (2013.01); *B23B 31/20* (2013.01); *B23Q 1/0009* (2013.01); *B23Q 5/043* (2013.01); *B23Q 5/06* (2013.01); *B23Q 17/0971* (2013.01); *B23B 2260/128* (2013.01); *B23B 2260/1285* (2013.01); *B23C 2260/76* (2013.01); *B23Q 11/0891* (2013.01); *Y10T 279/21* (2015.01); *Y10T 409/30392* (2015.01);

(Continued)

(58) Field of Classification Search
CPC .............. B23Q 1/0009; Y10T 279/21; B23B 2260/128; B23B 2260/1285; B23B 2231/26
USPC ......................................................... 279/126
See application file for complete search history.

(56) References Cited

U.S. PATENT DOCUMENTS

| | | |
|---|---|---|
| 2,799,934 A | 7/1957 | Kern |
| 3,058,218 A | 10/1962 | Kleesattel et al. |

(Continued)

FOREIGN PATENT DOCUMENTS

| | | |
|---|---|---|
| DE | 3246111 A1 | 8/1983 |
| DE | 3819799 | 2/1989 |

(Continued)

OTHER PUBLICATIONS

Offiial Action dated Aug. 23, 2016, issued in Korean counterpart patent application (No. 10-2016-7009572).

(Continued)

*Primary Examiner* — Erica E Cadugan
(74) *Attorney, Agent, or Firm* — Womble Bond Dickinson (US) LLP

(57) ABSTRACT

A live tool system having a live tool and a collar surrounding a rotating shaft or a rotating cutting tool of the live tool. The collar houses at least one sensor capable of monitoring an operating condition proximate to the cutting tool during a cutting operation. Example operating conditions including temperature and vibration. The system also includes a wireless transmitter in communication with the at least one sensor for transmitting a signal for use by a machining center controller.

20 Claims, 12 Drawing Sheets

(51) Int. Cl.
B23Q 1/00 (2006.01)
B23Q 5/04 (2006.01)
B23Q 11/08 (2006.01)

(52) U.S. Cl.
CPC .............. *Y10T 409/30728* (2015.01); *Y10T 409/303752* (2015.01); *Y10T 409/309408* (2015.01)

(56) References Cited

U.S. PATENT DOCUMENTS

| | | | |
|---|---|---|---|
| 3,383,805 A | 5/1968 | Powell | |
| 3,707,336 A | 12/1972 | Theis, Jr. et al. | |
| 3,733,143 A | 5/1973 | Theis, Jr. | |
| 3,754,487 A | 8/1973 | Nachtigal | |
| 3,930,744 A | 1/1976 | Theis, Jr. | |
| 3,976,389 A | 8/1976 | Theis, Jr. | |
| 4,060,336 A | 11/1977 | Theis, Jr. et al. | |
| 4,118,871 A | 10/1978 | Kirkham | |
| 4,229,139 A | 10/1980 | Marantette et al. | |
| 4,566,849 A | 1/1986 | Flink | |
| 4,776,752 A | 10/1988 | Davis | |
| 4,784,539 A | 11/1988 | Lehmkuhl | |
| 4,941,828 A | 7/1990 | Kimura | |
| 5,020,968 A | 6/1991 | Yamada et al. | |
| 5,065,035 A | 11/1991 | Juengel | |
| 5,228,700 A | 7/1993 | Biesold et al. | |
| 5,293,747 A | 3/1994 | Geiger | |
| 5,328,271 A | 7/1994 | Titcomb | |
| 5,348,430 A | 9/1994 | Metz et al. | |
| 5,364,227 A | 11/1994 | Franetzki et al. | |
| 5,388,051 A | 2/1995 | Seki et al. | |
| 5,419,661 A | 5/1995 | Meachum | |
| 5,428,548 A | 6/1995 | Pilborough et al. | |
| 5,439,346 A | 8/1995 | Bowser et al. | |
| 5,507,642 A | 4/1996 | Wohlgemuth | |
| 5,517,190 A | 5/1996 | Gunn | |
| 5,566,770 A | 10/1996 | Bowser | |
| 5,659,205 A | 8/1997 | Weisser | |
| 5,674,032 A | 10/1997 | Slocum et al. | |
| 5,778,550 A | 7/1998 | Carli et al. | |
| 5,807,108 A | 9/1998 | Schwenoha et al. | |
| D409,466 S | 5/1999 | Bowser | |
| 6,254,321 B1 | 7/2001 | Lind | |
| 6,318,937 B1 | 11/2001 | Lind | |
| 6,328,509 B1 | 12/2001 | Lind | |
| 6,368,052 B2 | 4/2002 | Uesugi et al. | |
| 6,413,025 B1 | 7/2002 | Lind | |
| 6,413,026 B1 | 7/2002 | Lind | |
| 6,413,027 B1 | 7/2002 | Lind | |
| 6,413,028 B1 | 7/2002 | Lind | |
| 6,424,821 B1 | 7/2002 | Komai et al. | |
| 6,497,538 B1 | 12/2002 | Lind | |
| 6,568,886 B1 | 5/2003 | Lind | |
| 6,579,093 B2 | 6/2003 | Bailey et al. | |
| 6,840,723 B2 | 1/2005 | Jacobsson | |
| 6,874,980 B1 | 5/2005 | Noelle et al. | |
| 6,974,286 B2 | 12/2005 | Lawson | |
| 7,077,732 B2 | 7/2006 | Dodds | |
| 7,152,692 B2 | 12/2006 | Hurskainen et al. | |
| 7,155,825 B2 | 1/2007 | Lind | |
| 7,223,069 B2 | 5/2007 | Dodds | |
| 7,240,845 B2 | 7/2007 | Komine et al. | |
| 7,289,873 B2 | 10/2007 | Redecker et al. | |
| 7,568,867 B2 | 8/2009 | Bryan | |
| 7,641,537 B2* | 1/2010 | Thyssen | B23F 23/00 451/47 |
| D612,406 S | 3/2010 | Jackson et al. | |
| 7,710,287 B2* | 5/2010 | Lange | B23Q 1/0009 340/680 |
| 7,716,847 B2 | 5/2010 | Eisenberger et al. | |
| 7,967,552 B2 | 6/2011 | Brett et al. | |
| 8,096,736 B2* | 1/2012 | Migliore | B23B 29/0345 408/161 |
| 8,128,323 B2 | 3/2012 | Conroy et al. | |
| 8,196,674 B2 | 6/2012 | Ikuta et al. | |
| 8,297,949 B1 | 10/2012 | Mancl et al. | |
| 8,316,742 B2 | 11/2012 | Craig et al. | |
| 8,376,671 B2* | 2/2013 | Kaneko | B23Q 3/15546 279/126 |
| 8,382,426 B2 | 2/2013 | Itoh et al. | |
| 8,733,468 B2 | 5/2014 | Teipel et al. | |
| 9,038,744 B2 | 5/2015 | Swinford | |
| 9,067,310 B2 | 6/2015 | Keskiniva et al. | |
| 9,104,209 B2 | 8/2015 | Colussi et al. | |
| 9,144,874 B2* | 9/2015 | Fronius | B23Q 17/007 |
| 9,669,505 B2* | 6/2017 | Angel | B23Q 5/06 |
| 2002/0146295 A1 | 10/2002 | Schaer et al. | |
| 2003/0030565 A1 | 2/2003 | Sakatani et al. | |
| 2003/0103827 A1 | 6/2003 | Moller et al. | |
| 2004/0112678 A1 | 6/2004 | Lind | |
| 2004/0179915 A1 | 9/2004 | Hill et al. | |
| 2005/0019123 A1 | 1/2005 | Lawson | |
| 2005/0167131 A1 | 8/2005 | Hurskainen et al. | |
| 2006/0014475 A1* | 1/2006 | Sekiya | B24B 7/228 451/5 |
| 2006/0153721 A1 | 7/2006 | Dodds | |
| 2008/0063483 A1 | 3/2008 | Kawai et al. | |
| 2008/0195244 A1 | 8/2008 | Jou et al. | |
| 2009/0060673 A1 | 3/2009 | Mace | |
| 2009/0123247 A1 | 5/2009 | Clark | |
| 2009/0199591 A1 | 8/2009 | Lee et al. | |
| 2009/0223691 A1 | 9/2009 | Ikuta et al. | |
| 2009/0301744 A1 | 12/2009 | Swinford | |
| 2009/0320820 A1 | 12/2009 | Sinisi | |
| 2009/0322042 A1* | 12/2009 | Kitamura | B23B 31/202 279/49 |
| 2010/0145496 A1 | 6/2010 | Tang et al. | |
| 2011/0135415 A1 | 6/2011 | Hamaguchi et al. | |
| 2012/0018657 A1 | 1/2012 | Keskiniva et al. | |
| 2012/0111590 A1 | 5/2012 | Rothenwaender et al. | |
| 2012/0138328 A1 | 6/2012 | Teipel et al. | |
| 2013/0195576 A1 | 8/2013 | Jaffe et al. | |
| 2013/0322979 A1 | 12/2013 | Koike et al. | |
| 2014/0054092 A1 | 2/2014 | Buckman, Sr. | |
| 2014/0080689 A1 | 3/2014 | Suzuki et al. | |
| 2014/0083540 A1 | 3/2014 | Colussi et al. | |
| 2014/0212236 A1* | 7/2014 | Veittinger | B23Q 1/0009 409/79 |
| 2015/0367472 A1 | 12/2015 | Suzuki et al. | |

FOREIGN PATENT DOCUMENTS

| | | |
|---|---|---|
| DE | 19917693 | 10/2000 |
| DE | 20218632 U1 | 2/2003 |
| DE | 10163734 | 7/2003 |
| DE | 10-2008-008885 A1 | 8/2008 |
| DE | 102009012805 | 10/2009 |
| FR | 2688731 | 9/1993 |
| WO | WO 99/58984 A1 | 11/1999 |
| WO | WO 2003/019753 | 3/2003 |
| WO | WO 2008/139472 | 11/2008 |

OTHER PUBLICATIONS

International Search report issued in PCT counterpart application (No. PCT/IB2014/001795) dated Apr. 22, 2015.
Written Opinion issued in PCT counterpart application (No. PCT/IB2014/001795) dated Apr. 22, 2015.
International Search Report dated Jun. 2, 2016, issued in counterpart International (PCT) Application (No. PCT/IB2016/000033).
Written Opinion dated Jun. 2, 2016, issued in counterpart International (PCT) Application (No. PCT/IB2016/000033).

\* cited by examiner

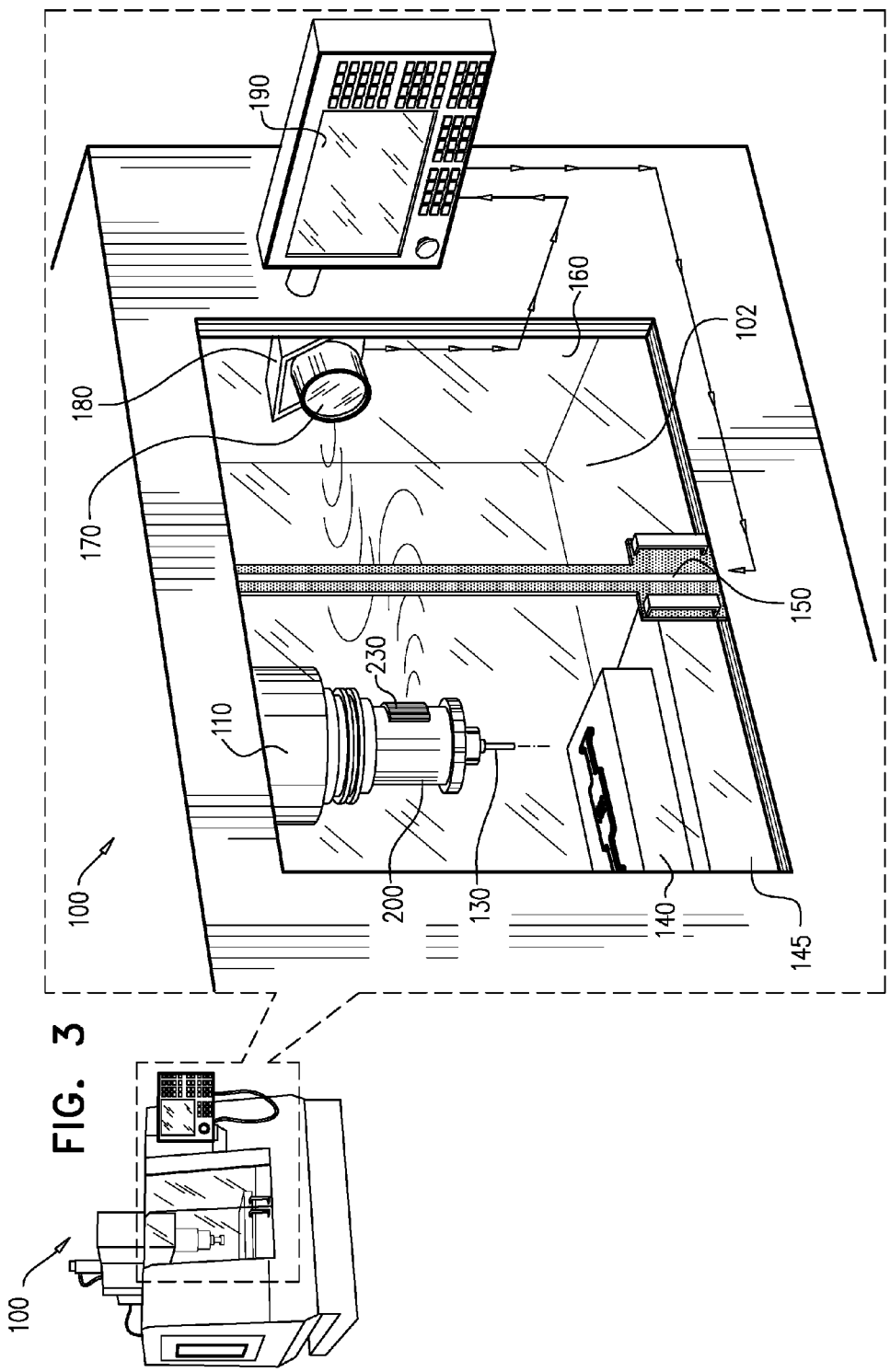

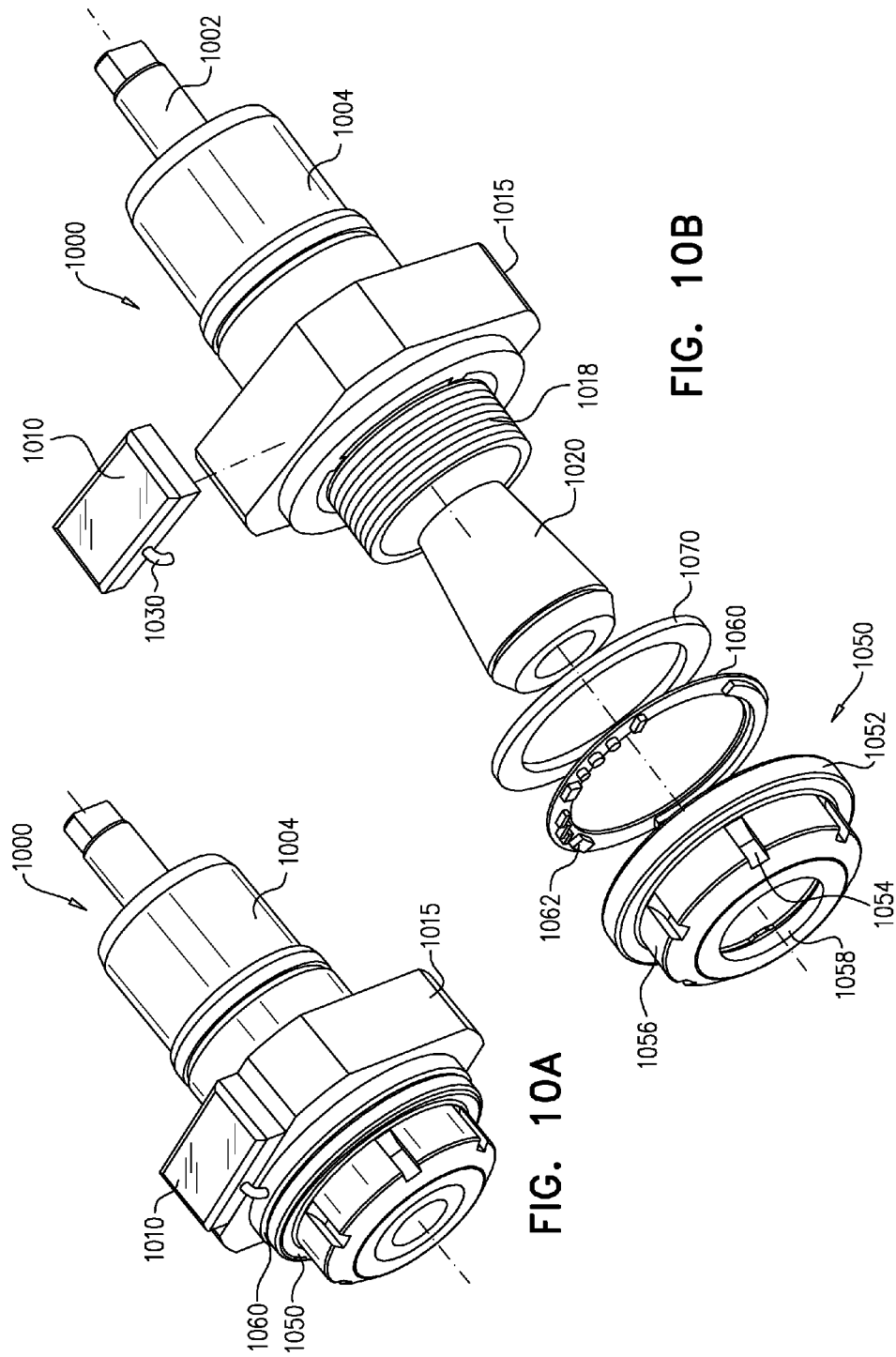

LIVE TOOL COLLAR HAVING WIRELESS SENSOR

RELATED APPLICATIONS

The present application claims priority to U.S. Provisional Application No. 62/281,431, filed Jan. 21, 2016. The contents of the aforementioned application are incorporated by reference in their entirety.

FIELD OF INVENTION

This disclosure relates to live tools, such as mechanical and fluid drive spindles. This disclosure also relates to enclosed machining centers in which the live tools are used.

BACKGROUND

Machining centers are often used for metal and wood cutting or milling processes to shape a workpiece into the desired configuration. The process of forming a finished product can require several distinct types of cutting or milling requiring a variety of different tool and a variety of relative motions between the workpiece and the tool. To provide for the substantially continuous processing of the workpiece, machining centers often include automatic tool changers (ATC) that are capable of changing out the in-use tools.

Often, some of the tools within the ATC are live tools. Live tools provide a rotating cutting tool in additional to the translational motion of the tools themselves. Live tools may be mechanically driven live tools or may be fluid driven live tools. In the case of mechanically drive live tools, the machining center may operate a centralized motor that is mechanically engaged with the live tool when the live tool has been selected for use. Thus, knowledge of the operating conditions of the live tool must be inferred from the operation of the centralized motor within the ATC.

In the case of fluid driven spindles, the centralized drive motor may not be required at all. Within relying upon the wired communication between a controller of the machining center and the ATC, there may not be any way to fully monitor the operation of a fluid driven spindle in-use within a machining center set up for mechanical live tools. In other words, current machine control systems may be unable to sufficiently determine the live tool's operating condition for access control or other reasons. Even when powered through the machine control system, the tool's operating condition is monitored indirectly from afar, such as through a centralized motor. This indirect monitoring can lead to inaccuracies caused by time lag or a break in the system. Therefore there is a need for a system that allows for local, accurate monitoring of the operation of live tools. Preferably, there is a need for a monitoring system that may be applied somewhat universally to existing live tools.

SUMMARY

The present disclosure seeks to improve communication between machining centers and the live tools in-use therein. In some embodiments, the present disclosure provides a system that may be substantially universally applied to existing live tools.

The present disclosure may be cast in the form of the following paragraphs:

Paragraph 1. A live tool system, the system comprising:
a live tool;
a collar surrounding a rotating shaft or a rotating cutting tool of the live tool, the collar housing at least one sensor capable of monitoring an operating condition proximate to the cutting tool during a cutting operation; and
a wireless transmitter in communication with the at least one sensor for transmitting a signal for use by a machining center controller.

Paragraph 2. The live tool system of Paragraph 1, wherein the at least one sensor is a temperature sensor and the operating condition comprises the temperature adjacent to the cutting tool.

Paragraph 3. The live tool system of Paragraph 2, further comprising:
a wireless receiver capable of receiving signals sent from the wireless transmitter; and
a controller connector for operably connecting the wireless receiver to the machining center controller,
wherein the controller connector is configured to relay temperature information to the machine center controller for adjusting at least one function of the machining center in response to the temperature information.

Paragraph 4. The live tool system of Paragraph 1, wherein the at least one sensor is a vibration sensor and the operating condition comprises vibration caused by the rotation and cutting operation of the cutting tool.

Paragraph 5. The live tool system of Paragraph 1, wherein the collar is configured to replace a collet or a collet locking nut used to secure the cutting tool to the live tool.

Paragraph 6. The live tool system of Paragraph 5, wherein the collar is an ER Collet Chuck Lock Nut.

Paragraph 7. The live tool system of Paragraph 1, wherein the collar is held in place by a collet locking nut.

Paragraph 8. The live tool system of Paragraph 1, wherein the collar is mounted to the live tool with a bracket band.

Paragraph 9. The live tool system of Paragraph 1, further comprising a housing for the wireless transmitter, the housing being mounted to the live tool at a location remote from the collar, and the wireless transmitter is connected to the collar by a cable.

Paragraph 10. The live tool system of Paragraph 1, wherein the housing is mounted to the live tool by a transmitter connector band.

Paragraph 11. The live tool system of Paragraph 1, wherein the live tool is a fluid drive live tool.

Paragraph 12. The live tool system of Paragraph 1, wherein the live tool is a mechanically driven live tool.

Paragraph 13. The live tool system of Paragraph 1, wherein the at least one sensor functions without modification to the shaft or the cutting tool.

Paragraph 14. A wireless monitoring kit for mounting to a live tool, comprising:
a collar configured to mount to the live tool such that the collar at least partially surrounds a rotating shaft or a rotating cutting tool of the live tool, the collar housing at least one sensor capable of monitoring an operating condition proximate to the cutting tool during a cutting operation; and
a wireless transmitter in communication with the at least one sensor for transmitting a signal for use by a machining center controller.

Paragraph 15. The kit of Paragraph 14, wherein the at least one sensor is a temperature sensor and the operating condition comprises the temperature adjacent to the cutting tool.

Paragraph 16. The kit of Paragraph 15, further comprising:

a wireless receiver capable of receiving signals sent from the wireless transmitter; and a controller connector for operably connecting the wireless receiver to the machining center controller, wherein the controller connector is configured to relay temperature information to the machine center controller for adjusting at least one function of the machining center in response to the temperature information.

Paragraph 17. The kit of Paragraph 14, wherein the at least one sensor is a vibration sensor and the operating condition comprises vibration caused by the rotation and cutting operation of the cutting tool.

Paragraph 18. The kit of Paragraph 14, wherein the collar is configured to replace a collet or a collet locking nut used to secure the cutting tool to the live tool.

Paragraph 19. A method of monitoring a live tool, comprising:

mounting a collar around at least one of a cutting tool, a collet, and a shaft of the live tool, the collar comprising at least one temperature sensor;

mounting a wireless transmitting unit to the live tool, the wireless transmitting unit in communication with the at least one temperature sensor; and sensing the temperature adjacent to the cutting tool during a cutting operation using the at least one sensor.

Paragraph 20. The method of Paragraph 19, further comprising:

transmitting a signal representative of the sensed temperature to a wireless receiver in communication with a controller of a machining center; and adjusting or terminating operation of the live tool when a spike in temperature is detected.

BRIEF SUMMARY OF THE DRAWINGS

FIG. 3 shows a machining center according to some embodiments of the present disclosure.

FIG. 10A shows yet another example of a live tool usable with machining centers disclosed.

FIG. 10B shows an exploded view of the live tool of FIG. 10A.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

In some cases, fluid driven cutting tool spindles are replacing the use of electric spindles. The fluid driven cutting tool spindles may be capable of providing higher rotational speeds and are sometimes referred to as high-speed spindles.

Figure 1A:
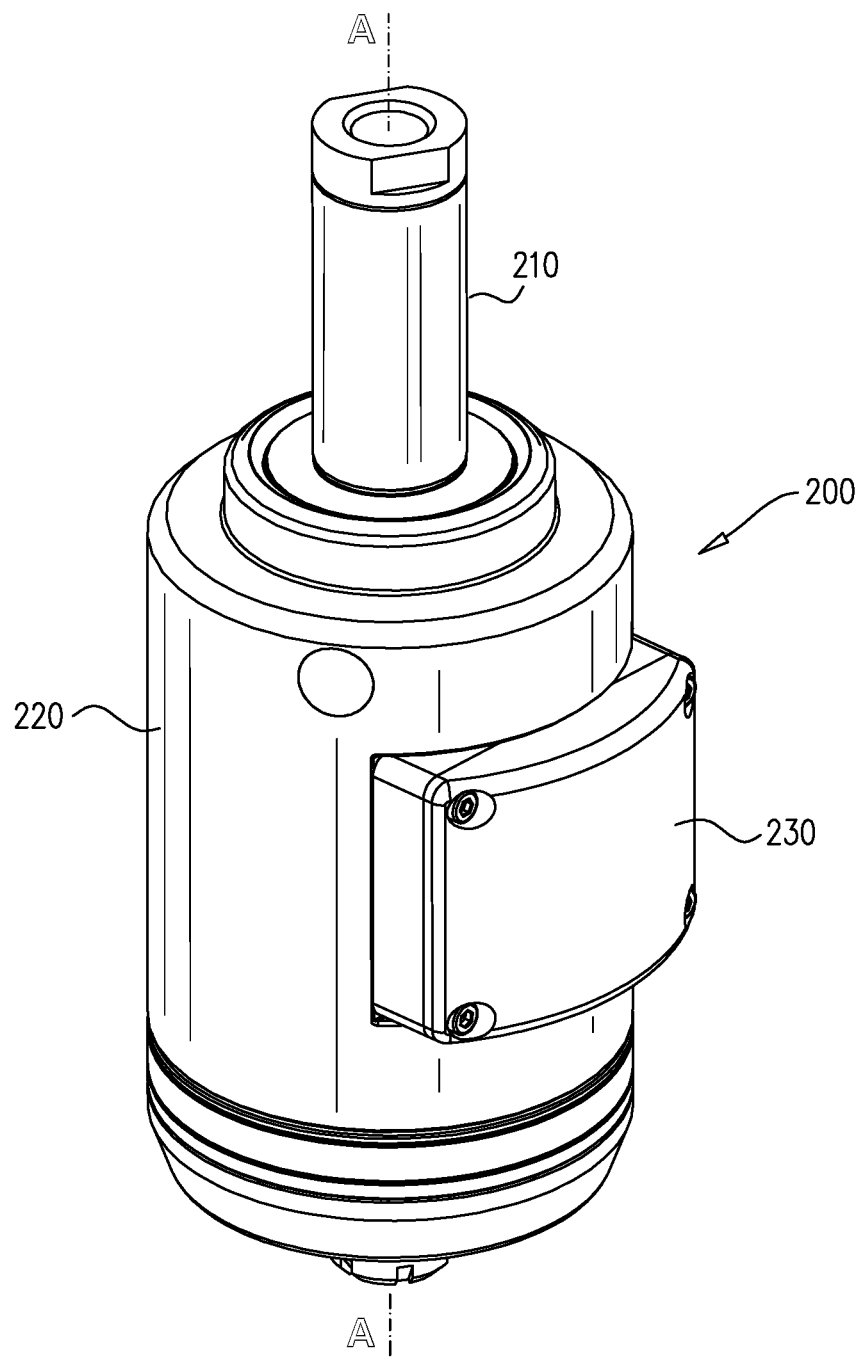
FIGS. 1A and 1B show an example of a fluid driven cutting tool spindle usable with machining centers disclosed.
Figure 1B:
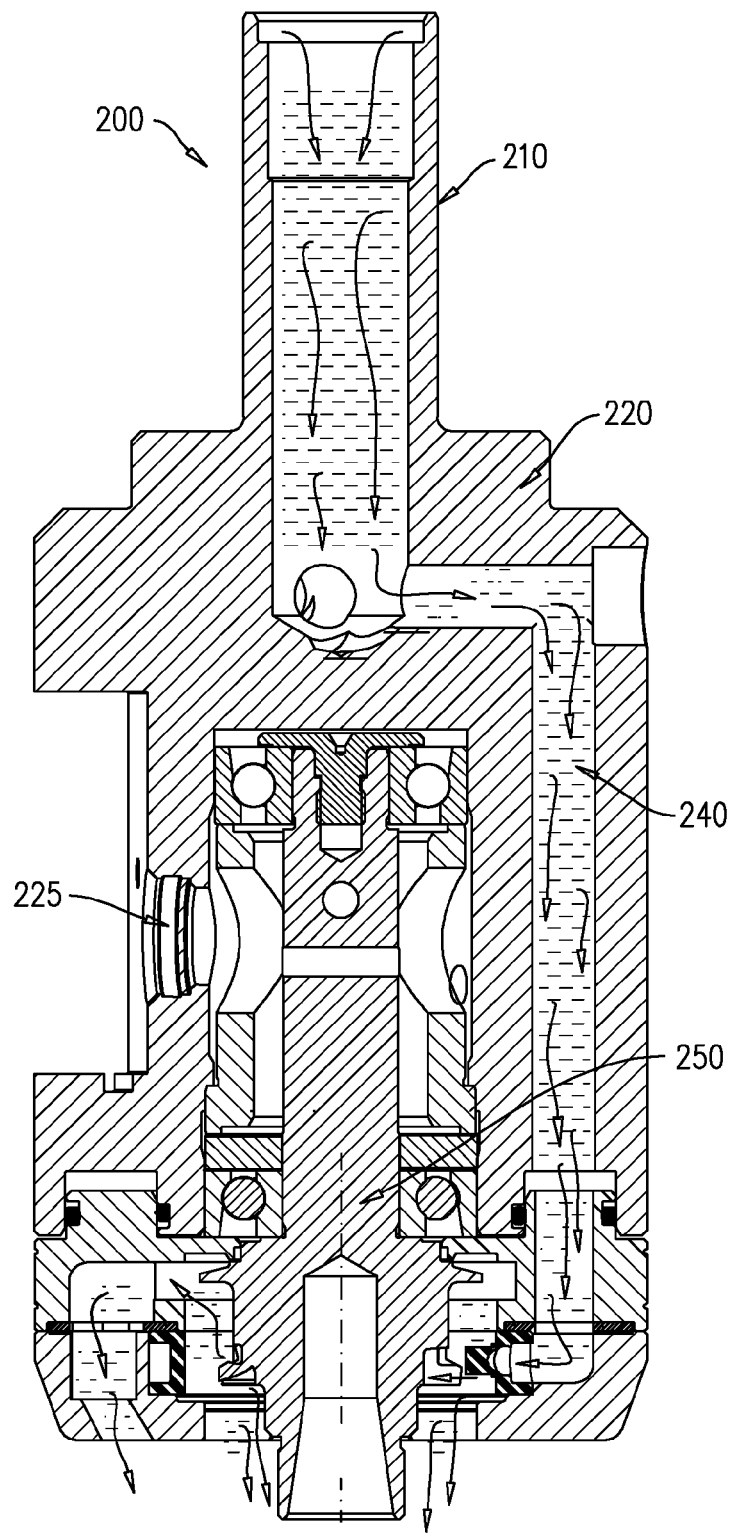

FIGS. 1A and 1B show an example of a fluid driven cutting tool spindle 200 that may be compatible with machining centers described in this disclosure. The fluid drive cutting tool spindle 200 is an embodiment designed for use with a wireless monitoring system as discussed below. The fluid driven cutting tool spindle 200 of this disclosure may be driven by liquid or gas passing through the spindle's housing at relatively high pressures. The fluid driven cutting tool spindle 200 of FIGS. 1A and 1B is similar to high speed spindles described in related, jointly owned, U.S. application Ser. No. 14/461,006 filed on Aug. 15, 2014, which is incorporated herein in its entirety.

As seen in FIG. 1A, the fluid driven cutting tool spindle 200 includes a shank 210, a housing 220 and a sensor module 230 mounted to the housing 220. As seen in FIG. 1B, the shank 210 and the housing 220 define a fluid channel 240. Fluid exiting the fluid channel 240 may act upon a shaft 250 to rotate the shaft 250 around a rotation axis A shown in FIG. 1A. A cutting insert 130 (see FIG. 4) may be mounted to the end of the shaft 250 for synchronous rotation therewith.

The housing 220 may have an opening 225 to provide a generally unobstructed path between the sensor module 230 and the shaft 250. In some embodiments, the opening 225 may be physically obstructed but substantially transparent to specific frequencies of the electromagnetic spectrum.

Figure 2A:
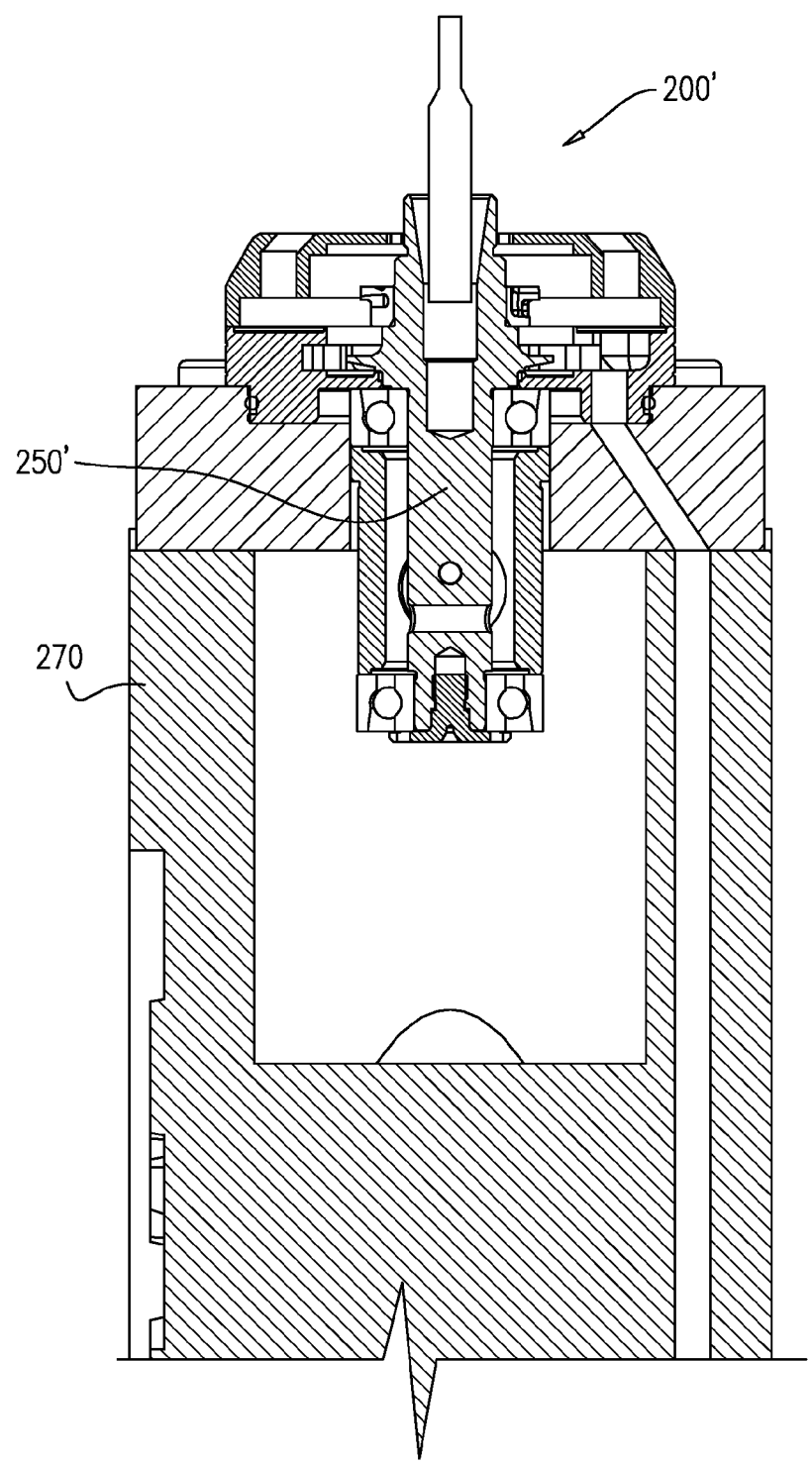
FIG. 2A shows a second example of a fluid driven cutting tool spindle usable with machining centers disclosed.
Figure 2B:
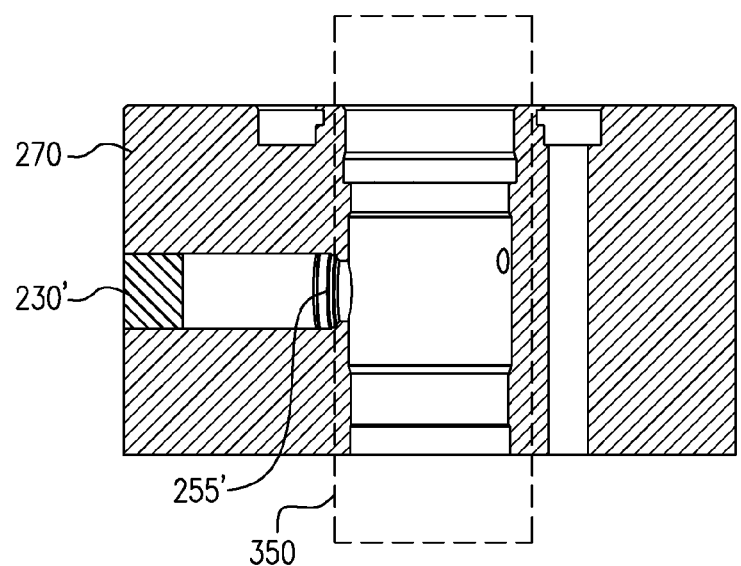
FIG. 2B shows a detailed view of FIG. 2A according to one embodiment thereof.
Figure 2C:
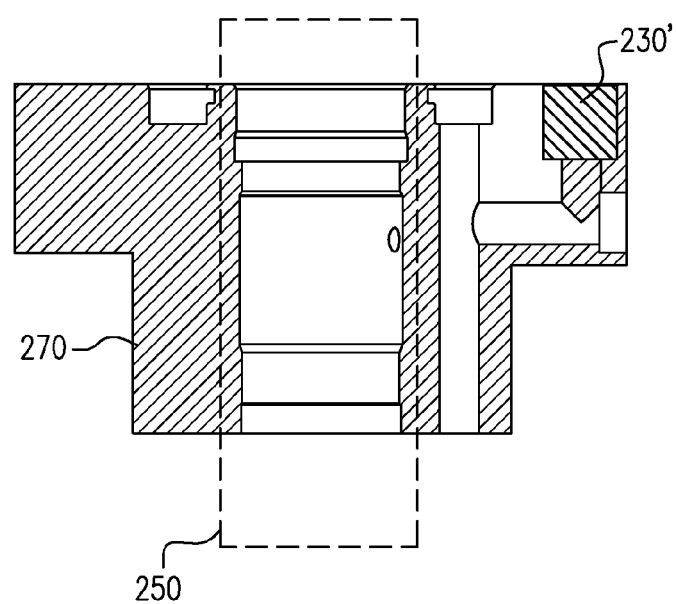
FIG. 2C shows a detailed view of FIG. 2A according to a second embodiment thereof.

FIG. 2A shows an alternative fluid driven cutting tool spindle 200'. The fluid driven cutting tool spindle 200' may be mounted in a monoblock 270 of a tool turret. The monoblock 270 provides the fluid and passages for powering the shaft 250' instead of requiring a specific spindle housing. As shown in FIG. 2B the monoblock 270 may also have an opening 225' and an associated sensor module 230'. In other embodiments, as shown in FIG. 2C, the sensor module 230' indirectly assesses spindle characteristics by monitoring fluid characteristics passing through the monoblock without an opening into the shaft.

The present disclosure should not be limited to the fluid driven spindles 200, 200' disclosed above. Other configurations of fluid driven spindles 200 may also be suitable for the present disclosure. For example, the driving fluid may be channeled through the shaft of the spindle instead of the housing or the monoblock. As discussed above, mechanical spindles may also benefit from one or more aspects of the present disclosure.

FIG. 3 shows a machining center 100. Machining centers within the scope of this disclosure include milling or turning centers, automatic, CNC, semi-automatic or manual stations. In this non-limiting example, the fluid driven cutting tool spindle 200 is mounted within a machine spindle 110 that is disposed within the machining center 100. The fluid driven cutting tool spindle 200 supports a cutting insert 130 (as referred to as a cutting tool). The machine spindle 110, fluid driven cutting tool spindle 200, cutting insert 130, and a workpiece 140 are housed within an enclosure 102 of the machining center 100. The workpiece 140 may sit upon or be held by a workpiece support 145 that may be movable. The enclosure 102 may be accessed through at least one door 160. The at least one door 160 includes a selectively engaged latch 150 that is capable of locking the door 160 in a closed position.

As used herein, the term door refers to any means by which at least the primary opening of the machining center is closed. The primary opening of the machining center is the opening through which the workpiece is inserted and removed from the machining center. The door may be hinged, folding, sliding or any other means known in the art. The door may include a single pane or multiple panes. The door may be operated manually or automatically. The door may have at least one handle or other manipulation means known in the art.

In a conventional system, a machine control system operates the machine spindle 110 and the latch 150 in a wired configuration. When operating, the machine spindle is electrically powered to rotate, therefore turning the cutting insert 130. The machine control system controls the current to the machine spindle 110 that causes rotation, and when current is no longer being supplied to the machine spindle, the machine control system can disengage the latch 150. This wired communication between the machine spindle 110 and the machine control system may utilize an encoder to provide a signal that triggers engagement and disengagement of the latch 150.

However, the housing of the fluid driven cutting tool spindle 200 is intended to remain substantially rotationally stationary as fluid is run through the fluid driven cutting tool spindle 200 to rotate the cutting insert 130 with the driven shaft. Under this configuration, a conventional machine control system can be deprived of its ability to determine the active operation of the machine spindle 110 that would otherwise trigger the unlocking of the latch 150.

Figure 5:
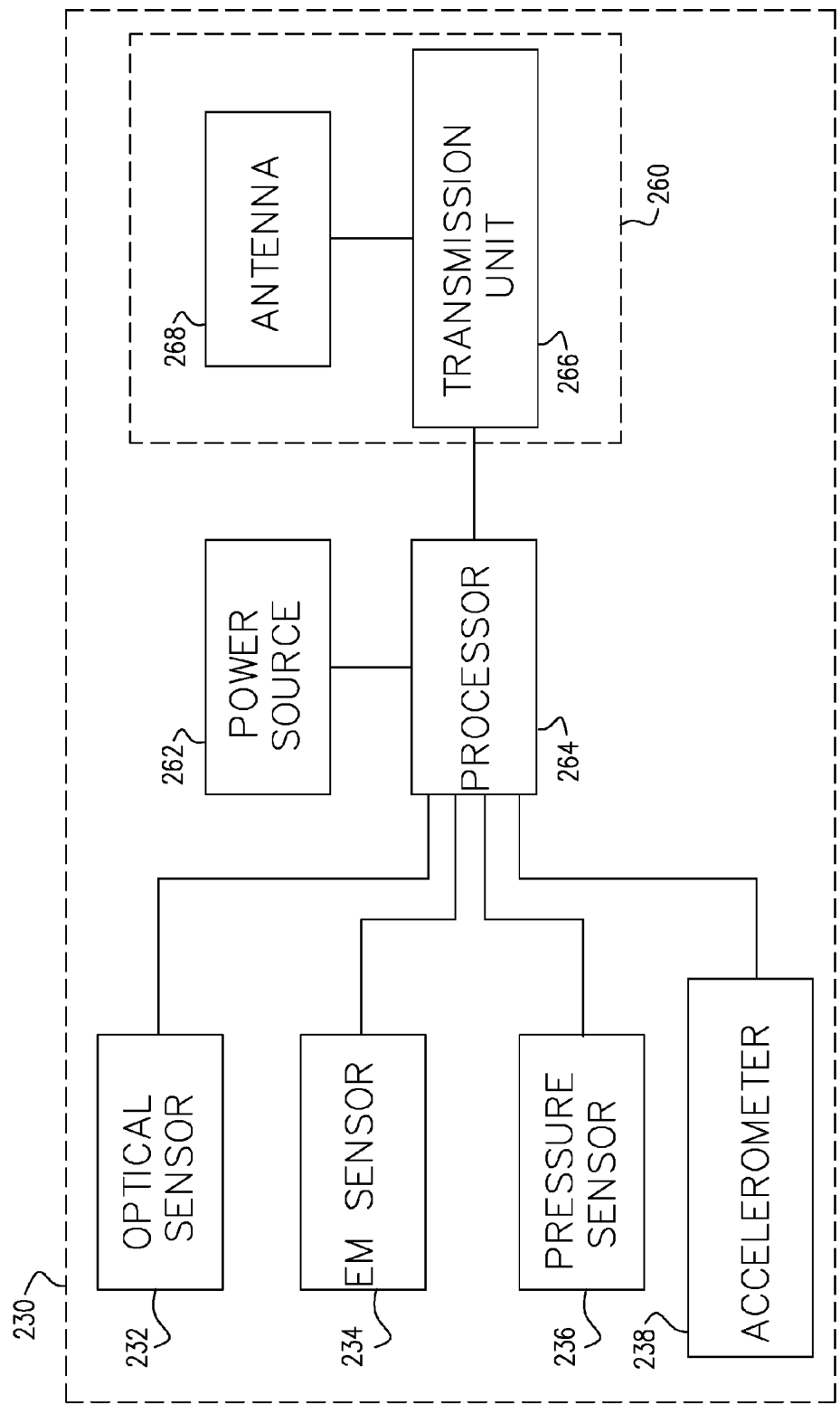
FIG. 5 shows a schematic representation of a sensor module according to embodiments of the present disclosure.

To help cure this potential problem, inventors have provided a sensor module 230 (see FIG. 5) mounted to, mounted on, embedded within, or operably arranged relative to the fluid driven cutting tool spindle 200 or the support structure, such as monoblock 270, thereof. The sensor module 230 monitors one or more operating conditions of the fluid driven cutting tool spindle 200. Operating conditions can include, but are not limited to, rotational speed of the shaft 250, rotational speed of the cutting insert 130, characteristics of fluid flow, such as pressure or flow rate, translational speed or acceleration of the housing 220, or relative position, speed or acceleration of the fluid driven cutting tool spindle 200 relative to the workpiece 140 or the workpiece support 145. Changes in operating conditions of the fluid driven cutting tool spindle 200 should lead to adjustment in one or more functions of the machining center. Functions of the machining center include, but are not limited to, allowing and baring access to the enclosure, driving the shaft 250 of the fluid driven spindle 200, and processing a workpiece by contacting the cutting insert 130 with a workpiece and providing relative translational motion therebetween. Some but not all of these functions may be controlled, managed or adjusted via the machining center controller 190. In some embodiments, the machining center controller 190 is an internal controller, or includes multiple components located on or within the machining center 100. Those functions controlled by the machining center controller may be referred to as processing conditions. Therefore processing conditions relate at least to the conditions under which a workpiece is processed, such as the relative motion of the workpiece relative to the cutting insert 130, or the fluid characteristics used to drive the shaft 250.

In some embodiments, the sensor module 230 may directly monitor the rotational speed of the shaft 250 through the opening 225. For example, the sensor module 230 may include non-contact motion sensors such as an optical sensor 232 capable of sensing rotational speed by monitoring of a visual mark located on the shaft 250, where the mark periodically sweeps through the vision of the optical sensor 232. The optical sensor 232 may use any known optical technology, such as visible light, laser, infra-red light, or ultraviolet light.

Alternatively or additionally, the sensor module 230 may include sensors based on electromechanical, magnetic, optical, magnetoelastic, or field-effect technologies, such as an electromagnetic sensor 234 capable of sensing rotational speed by monitoring the frequency resulting from a magnetic marker placed upon the shaft 250 as the magnetic marker rotates past the electromagnetic sensor 234. In some embodiments, non-contact motion sensors within the sensor module 230 may use microwave technology.

Alternatively or additionally, the sensor module 230 may include a pressure sensor 236 (see FIG. 5) in fluid communication with the fluid channel 240 (see FIG. 1B) or other path of driving fluid. The pressure sensor 236 may monitor the magnitude of the fluid pressure running through the fluid channel 240. A fluid sensor that reads low, or zero, relative fluid pressure may infer a low or zero rotational speed for the shaft 250. Thus the sensor module 230 with a pressure sensor 236 would indirectly determine the approximate rotational speed of the shaft 250 and the cutting insert 130. In other embodiments other fluid sensors may be used that operate based on related characteristics such as flow rate. As understood from the preceding, in some embodiments, more than one type of sensor may be used to monitor separate operating conditions of the fluid driven cutting tool spindle 200.

In some embodiments, the fluid driven cutting tool spindle 200 is at rest when the shaft speed, as sensed by the sensor module 230, is approximately zero RPM. In some embodiments, the sensor module 230 includes a wireless transmitter 260 (see FIG. 5). The wireless transmitter 260 may transmit a signal, indicative of sensor information received from a sensor, when the shaft 250 is at rest, i.e. zero RPM, or below some other predetermined, relatively slow, RPM. In other embodiments, the wireless transmitter 260 may substantially continuously, repeatedly or periodically transmit a signal that may directly or indirectly communicate the rotational speed of the shaft 250, or other information concerning other operating conditions of the fluid driven cutting tool spindle 200.

The sensor module 230 may use the wireless transmitter 260 to communicate wirelessly with a wireless receiver 170. The sensor module 230 may include a power source 262, such as a battery, or provide power to the sensors 232, 234, 236 and the wireless transmitter 260 of the sensor module 230 through an optional processor 264. The optional processor 264 may allow the necessary calculations concerning operating conditions to be computed by the sensor module 230. In other embodiments, the sensor module 230 transmits the rare data (e.g. a frequency) for interpretation by the machining center controller 190 or a processor associated with the wireless receiver 170. The wireless transmitter 260 may include a RF transmission unit 266 and an antenna 268.

In some embodiments, the wireless receiver 170 is connected to a fixture 180 that may be mounted within the enclosure 102 of the machining center 100. In some embodiments there is a direct line of sight between the sensor module 230 and wireless receiver 170. In other embodiments, wireless receiver 170 accepts signals transmitted from the sensor module 230 that are reflected from a surface within the enclosure 102 of the machining center 100.

The wireless receiver 170 is operably connected to the machining center controller 190 by a controller connector (discussed below) such that signals received by the wireless receiver 170 can be used by the machining center controller 190. In other words, the controller connector may relay information from the wireless receiver to the machining center controller. In some embodiments, once the machining center controller 190 processes the signal, it can communicate with the at least one latch 150, which secures the at least one door 160, in a conventional fashion to allow for accessing the enclosure 102. In other embodiments, the signal does not have to be processed by the machining center controller 190 because the signal is provided in a format already recognized by the machining center controller 190.

Figure 4:
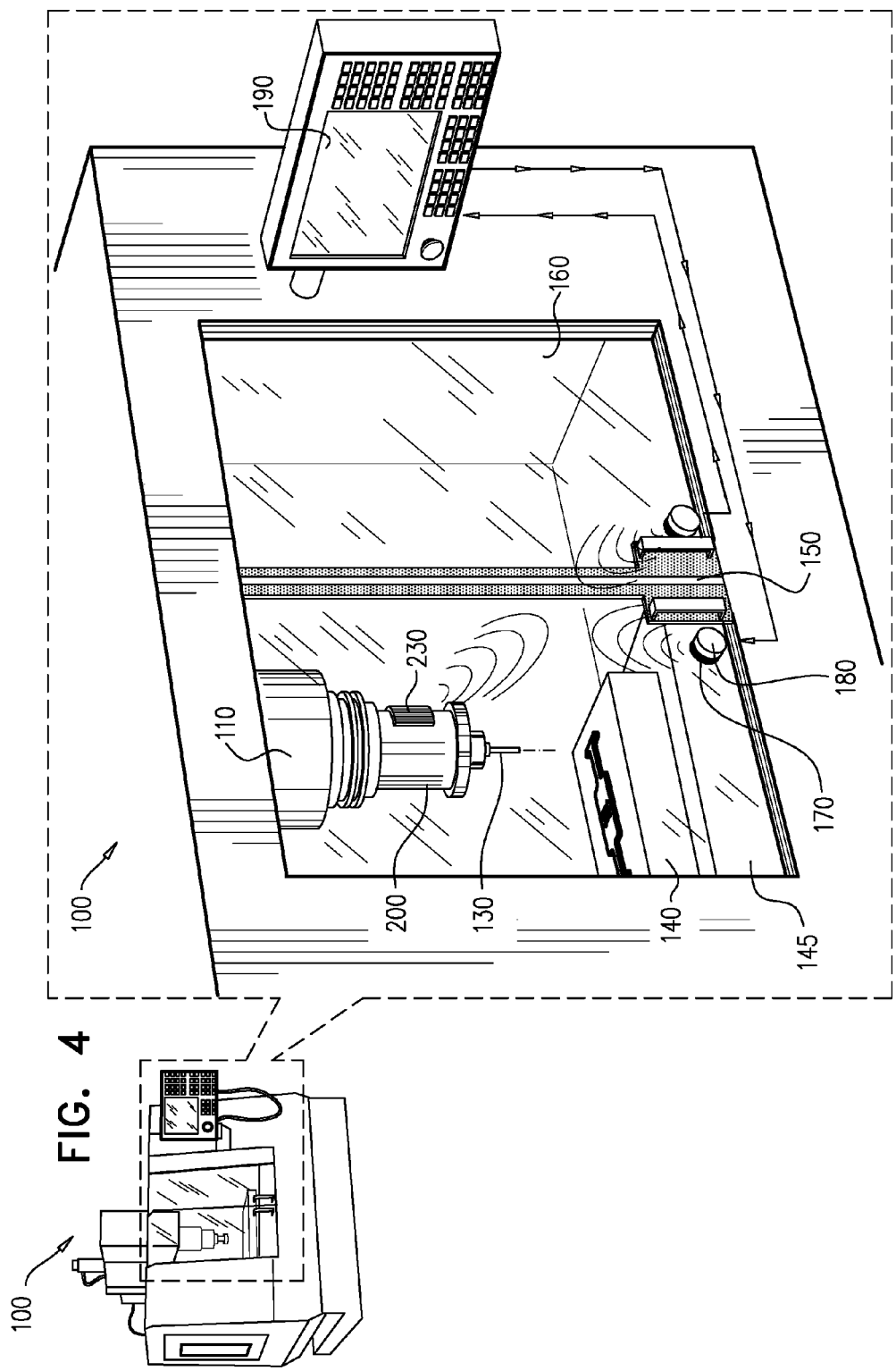
FIG. 4 shows a machining center according to some other embodiments of the present disclosure.

FIG. 4 shows an alternative embodiment for selectively allowing access to the machining center's enclosure 102. In the embodiment of FIG. 4, the wireless transmitter 260 of the sensor module 230 communicates wirelessly with the wireless receiver 170 that is in operational communication with the at least one latch 150 without relying upon the machining center controller 190. In some embodiments, the wireless receiver 170 is connected to the fixture 180 mounted on the door 160. In other embodiments, the fixture 180 may be mounted or incorporated with the latch 150. In still other embodiments, the wireless receiver 170 may itself be mounted to or integrated within the latch 150.

The operating principles of the machining center 100 may necessitate that the door latch 150 should be engaged, i.e. the latch provided in a locked position and unable to be opened, at all times that the machining center 100 is powered on, unless the sensor module 230 indicates that the operating condition of the shaft 250 meets a related access criteria. In one embodiment, where the operating condition is the rotational speed of the shaft 250, the access criteria could be that the shaft 250 is at rest, or rotating at an otherwise acceptably low speed below a minimum threshold.

In some embodiments, the sensor module 230 may monitor motions of multiple axes instead of, or in addition to, rotation of the shaft 250. For example, the sensor module 230 may include an accelerometer 238. In instances where the machine spindle 110 is capable of movement along the rotation axis A, or movement of the rotation axis A in space, the accelerometer 238 could sense these motions and transmit appropriate signals to prevent access into the enclosure 102 while parts are in motion.

In some embodiments additional motion sensors may be provided within the sensor module 230, or separate therefrom in order to monitor motion of other potentially movable elements within the enclosure. Examples of other movable elements that may be within the enclosure include: moving components of the workpiece support 145, moving components of measurement systems, moving components of auxiliary systems such as material handling systems, moving components of material removal systems such as metal shavings, cutting fluids etc. In each of the above examples, the same principle applies: the door latch 150 remains engaged to lock the door 160 at all times that the machine power is on, unless the plurality of motion sensors and sensor modules indicate that the access criteria for all of the axes is met, at which time, the door latch 150 can be disengaged and the door 160 can be opened.

In some embodiments, the access criteria may be set to allow access to the enclosure 102 if internal elements are moving with some speed below a minimum threshold, such as a minimum 10, 30 or 100 RPM of the shaft 250 or a minimum speed of 200, 500 or 1000 mm/min along any axis of motion for any moving component.

In some embodiments, the machining center 100 may include more than one door 160. One or more latches 150 may operate to lock the free ends of each door 160 with respect to one another. In other words each latch 150 may simultaneously lock the two doors 160 shown in FIGS. 3 and 4. The latches 150 may include a mechanical or an electro mechanical element that, when applied, can lock the machining center door and may also include an actuator that can change the element state such that the machining center door can be opened.

According to some embodiments related to FIG. 3, the communication between the wireless transmitter 260 and the wireless receiver 170 of the machining center controller 190 may allow for control of parameters beyond the locking and unlocking of the latch 150. For example, the wireless transmitter 260 may provide signals sufficient for the machining center controller 190 to substantially continuously monitor rotational speed of the shaft 250, and changes in rotational speed thereof, due to the material removal process. The shaft 250 is understood to be rotating at the same speed as a cutting insert 130 held therein. Therefore monitoring the shaft 250 can provide information about the operation of the cutting insert 130. Additionally, the cutting insert 130 could be monitored to provide information about the operation of the shaft 250. The rotational speed can be affected by numerous variables, such as cutting depth, tool sharpness, material hardness, tool breakage, and others.

While the machining center controller 190 indirectly drives the shaft 250 to rotate via the fluid pressure, the machining center controller 190 may control relative translational movement of the cutting insert 130 by moving the machine spindle 110 or the workpiece 140 via the workpiece support 145. It therefore may be beneficial to link the rate of translational motion imparted electrically by the machine center controller as a function of the shaft rotational speed. For example, if the rotation speed is decreasing due to a change in trajectory, the machining center controller 190 may slow down the relative translational motion to maintain a near constant rotation speed of the shaft 250 and cutting insert 130. Reducing relative translational motion should reduce the stresses between the workpiece 140 and the cutting insert 130 allowing for an increase in rotational speed. In effect, the sensor module 230 in connection with the wireless transmitter 260 and wireless receiver 170 provides a feedback loop to the machining center controller 190 that may otherwise not exist when operating fluid driven cutting tool spindles 200 without the sensor module 230.

According to some embodiments, the machining center controller 190 may be configured to operate a valve or other means capable of adjusting the pressure or flow rate of driving fluid for the fluid driven cutting tool spindle 200. Therefore the machining center controller 190 may be able to increase the pressure within the fluid channel 240 in an attempt to increase shaft rotation speed if the sensor module 230 senses an unexpected reduction is rotational speed. In other embodiments, the machining center controller 190 may be configured to shut off fluid to the fluid driven cutting tool spindle 200 if the shaft's rotational speed experiences a significant unexpected spike. Such a spike in the rotational speed of the shaft 250 may be an indication that the cutting insert 130 has broken and the machining center 100 should be shut off and maintenance performed.

Several different approaches have been considered by the inventors for implementing the improved machining centers disclosed herein. In one embodiment, a conventional machining center and conventional fluid driven cutting tool spindle may be retrofit to allow the disclosed communication and functions between the spindle and the machining center. The retrofit may be provided by a kit. The kit may include the sensor module 230, a wireless receiver 170, and components for operatively connecting the wireless receiver to the machine center controller 190 such that the machine center controller receives a signal having information that is understandable by the machine center controller for determining accessibility of the enclosure. The signal may provide understandable information in a form similar to data traditionally provided to a machine control system from an encoder. The components for operatively connecting may include hardware to operably connect the wireless receiver to the machining center controller. The components for operatively connecting may also include hardware or software if necessary to convert data from the sensors into the appropriate format for use by the machining center controller.

The optional hardware or software for translating the sensor data into a usable signal for the machine center controller may be contained within or accessed by the machine center controller. For example, software may be provided on a computer readable medium for installation onto said memory. Alternatively, the software may be stored on a computer readable medium that is not provided with the kit. Instead, the software may be downloaded by the machining center controller by accessing an internet address, requesting the software for download, providing an access key or verification, and receiving into memory of the machining center controller the software requested.

In other embodiments, the optional hardware or software may be pre-installed within the sensor module 230. In other embodiments, the optional hardware or software may be incorporated into a module with the wireless receiver 170.

The components for operatively connecting the wireless receiver to the machine center controller 190 may take any number of forms known in the art. For example, a wired connection may be made with a pre-exiting port provided on the machine center controller. Alternatively, a port may be included in the kit for joining to the machine center controller's mother board or other bus. In still other embodiments, the wireless receiver can be wired to or even mounted to machine center controller's mother board or Bus. Each of these embodiments may be collectively described as a controller connector.

Some fluid driven spindles are available with wireless sensor modules already included. These modules communicate with an independent display traditionally unable to function in association with the machine center controller as set out in this disclosure. Therefore an example retrofit kit for a conventional machining center in use with a fluid driven spindle that previously includes a sensor and output display may comprise only the components for operatively connecting the display/receiver to the machine center controller.

In some other embodiments a conventional machining center with electric spindles may be retrofit with a kit having the fluid driven cutting tool spindle 200 and the sensor module 230, a wireless receiver 170, components for operatively connecting the wireless receiver to the machine center controller 190.

In other embodiments, the operator may be provided with a machining center built specifically to perform the functions discussed in this disclosure. In this embodiment, the wireless receiver 170 may be integrated with the machine center controller 190.

Other ways to implement controlling machining center parameters, such as the locking and unlocking of a door latch, or adjustment of fluid pressure, using wireless signals from a sensor, which monitors fluid driven cutting tool spindle operating conditions may also be possible. These other examples include, but are not limited to, using a control system that bypasses the machining center controller of a conventional machining center completely.

Figure 6:
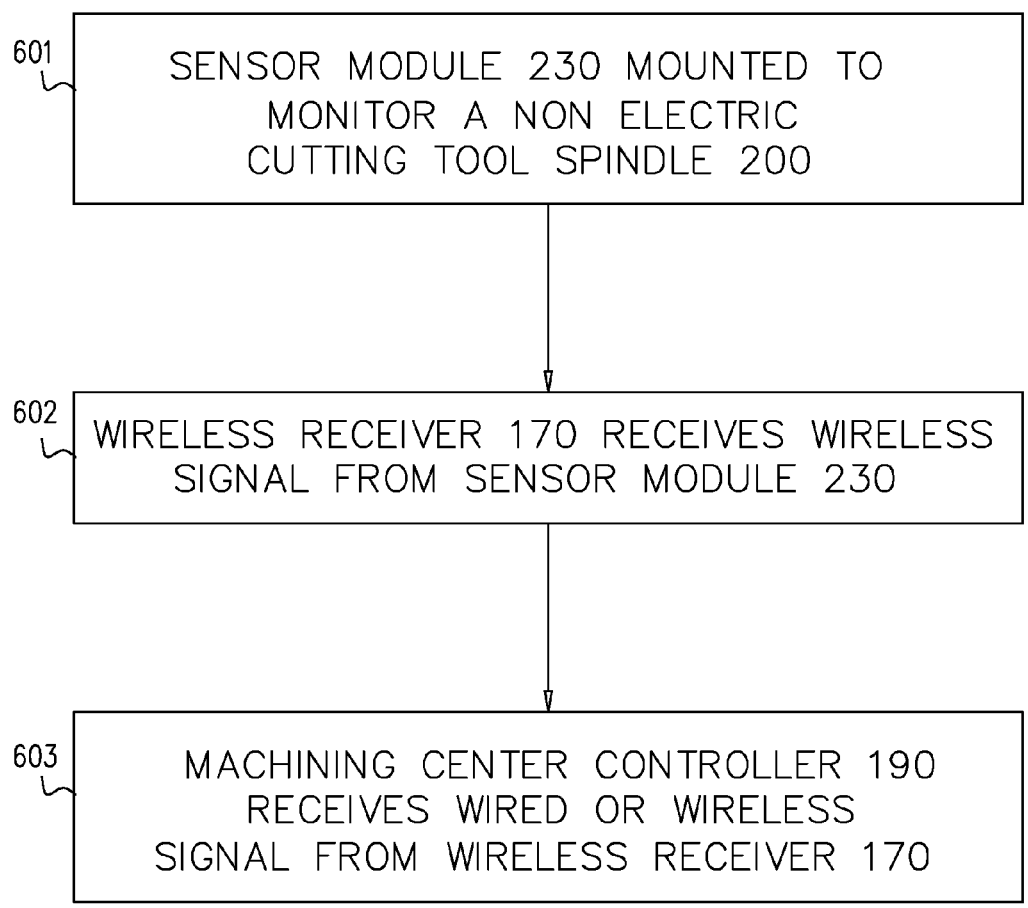
FIG. 6 shows a flow chart of an embodiment of the operation of the machining center of the present disclosure.

FIG. 6 provides a general flow chart illustrating the operation of machining centers according to embodiments of the present disclosure. A sensor module 230 monitors the shaft of a fluid driven cutting tool spindle 200 at step 601. Wireless transmission occurs between the sensor module 230 and a wireless receiver 170 at step 602. The machining center controller 190 then receives a signal from the wireless receiver 170 either directly or indirectly by wired or wireless transmission at step 603.

Figure 7:
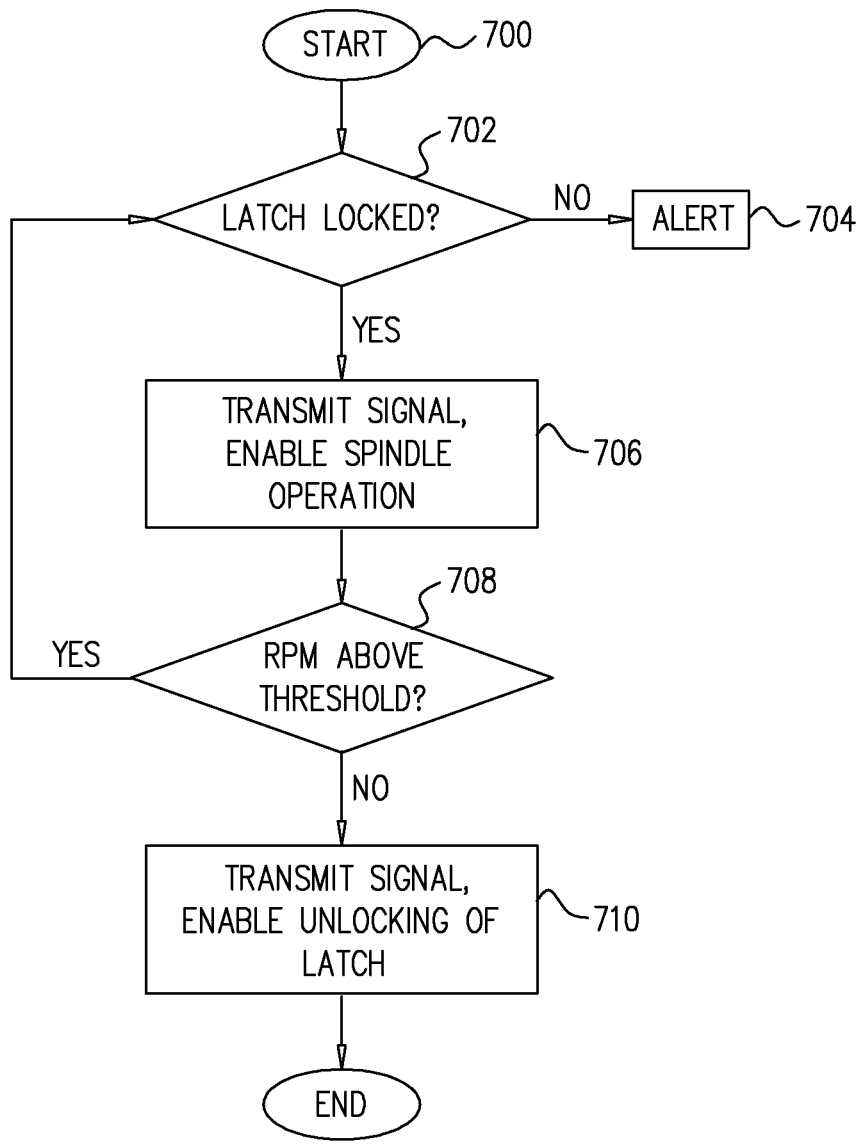
FIG. 7 shows a flow chart according to some door monitoring embodiments of the machining center of the present disclosure.

FIG. 7 shows an example decision tree using the disclosed machining center to control access thereto. The process starts at step 700. The locked or unlocked condition of the latch 150 may be initially checked at step 702. If the latch 150 is unlocked, an alert may be sent to the operator at step 704. If the latch 150 is locked, the machining center controller 190 will enable spindle operation through the provision of driving fluid and current to the necessary electrical components at step 706. The operating conditions of the fluid driven cutting tool spindle 200 may then be monitored to determine whether the RPM of the spindle meets a predetermined access criteria, such as whether the RPM is above a predetermined threshold (step 708). If the RPM fails to meet the access criteria, the system returns to confirm that the latch 150 remains locked. If the RPM is determined to meet the access criteria, the machining center controller can be signaled to unlock the latch or enable the user to unlock the latch (step 710). The process ends when the fluid driven cutting tool spindle is spinning at a rate meeting the predetermined access criteria and the latch is unlocked, which means the operator is able to access the interior of the machining center 100 to replace the tool or the workpiece.

Figure 8:
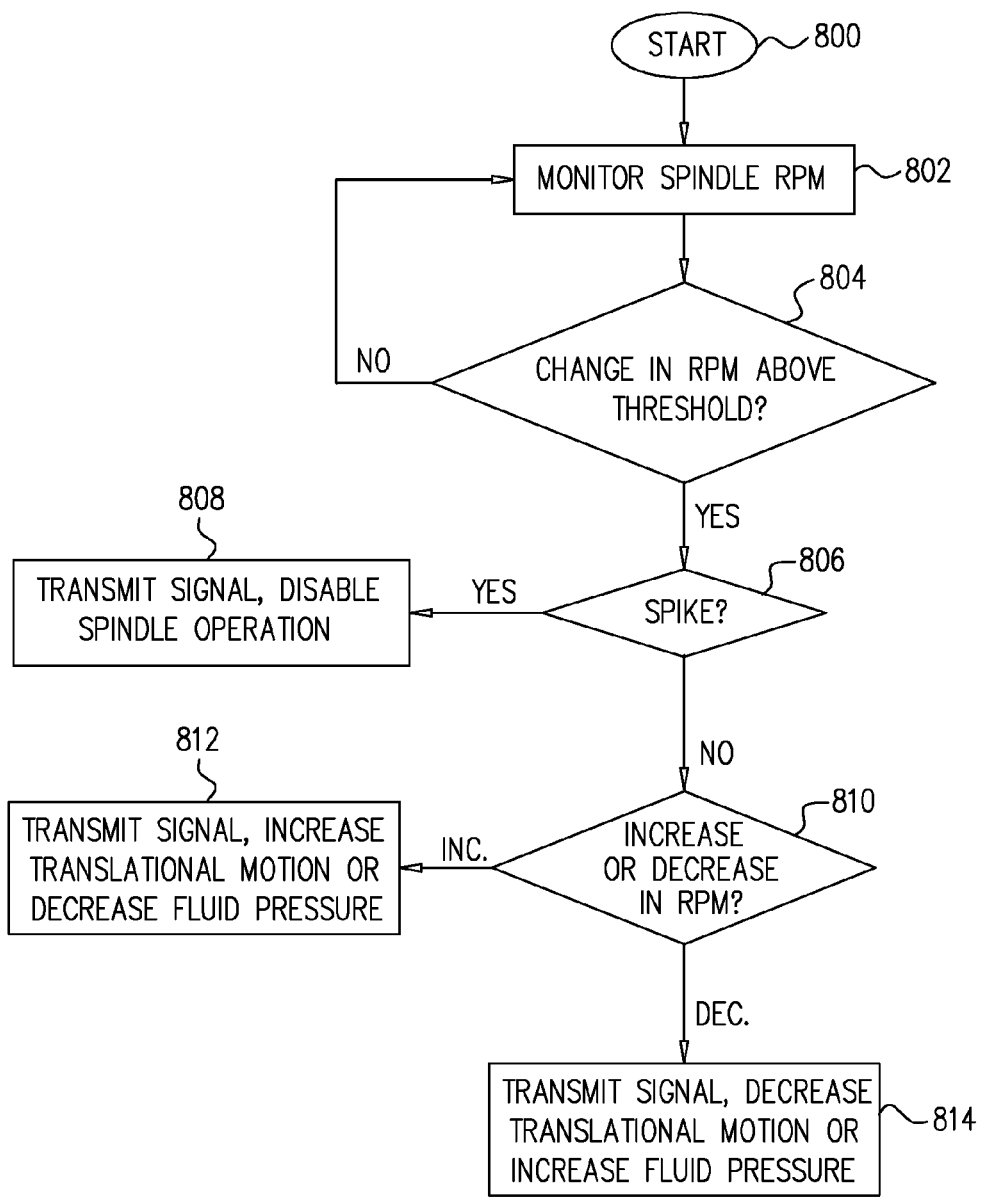
FIG. 8 shows a flow chart according to some spindle monitoring embodiments of the machining center of the present disclosure.

FIG. 8 shows an example decision tree using the disclosed machining center 100 to adjust the operating parameters thereof. The process may start at step 800. The wireless sensor 230 is continuously or periodically monitoring or determining the RPM of the shaft or the cutting tool of a fluid driven cutting tool spindle 200 at step 802. The wireless sensor 230, alone or in combination with the machining center controller 190 monitors for changes in RPM of the shaft or cutting tool as the spindle is removing material from a workpiece. Monitoring for changes in RPM is shown as step 804. If no change in speed above a threshold is found, the controller can loop back for another data point from the sensor module that is monitoring the spindle RPM. If the shaft has changed speed above a threshold, the presence of a spike can be determined (step 806). A spike is understood as a significant change in speed in a very short amount of time, for example one, two, or less than 10 sampling periods. Spike criteria can define both change in velocity and duration of the change. For example, a change in tool velocity from a working condition to a no load velocity, within a very short amount of time, would be one form of a spike. Similarly, a change in tool velocity from a working condition to a near zero velocity, within a very short amount of time, would be another form of a spike. If a spike, up or down, is found, the controller can signal to stop processing and disable operation (step 808). If no spike, i.e. significant change in rotational speed, is sensed, the controller may determine whether the change in rotational speed was an increase or a decrease (step 810). The controller may then wish to counteract the change in rotational speed. Therefore, if the rotational speed increased, translational speed can increase to apply more pressure at the cutting insert (step 812). Relative translational speed can be increased by increasing the speed of the workpiece or the translational speed of the spindle or both. Alternatively, the fluid pressure applied to the fluid powered cutting tool spindle 200 may be decreased by signaling the appropriate valves and/or pumps. If the rotational speed (RPM) decreased, the translational speed can decrease to reduce pressure at the cutting insert (step 814). Relative translational speed can be decreased by decreasing the speed of the workpiece or the translational speed of the spindle or both. Alternatively, the fluid pressure applied to the fluid driven cutting tool spindle 200 may be increased by signaling the appropriate valves and/or pumps.

Figure 9:
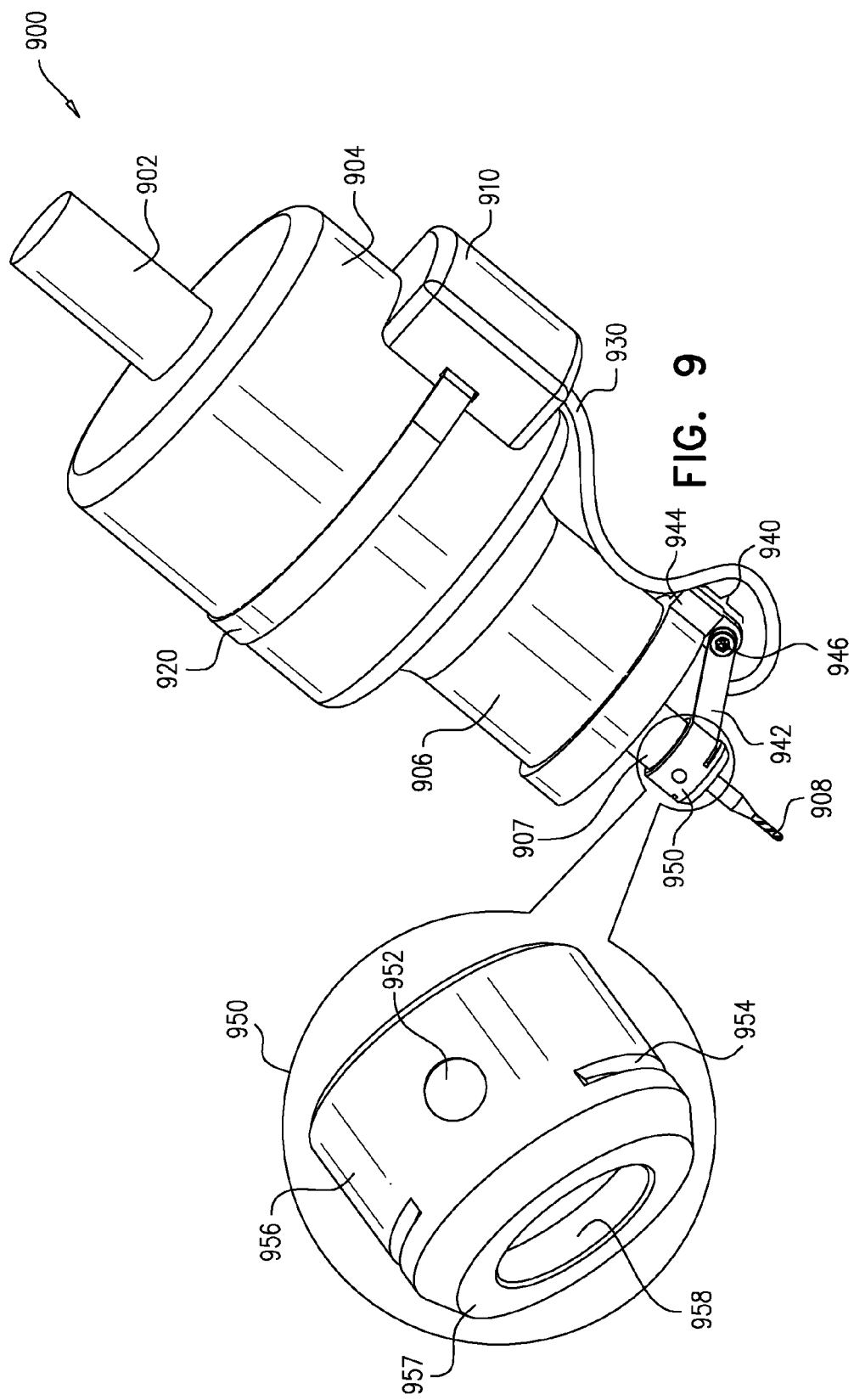
FIG. 9 shows another example of a live tool usable with machining centers disclosed.

The fluid driven cutting tool spindle 200 in FIGS. 1 and 2 shows an embodiment specifically designed to accept a unitary sensor module 230 and allow for a through-housing view of the shaft 250. A wireless monitoring system according to aspects of the present disclosure may be configured for use with other live tools, such as the fluid driven spindle type live tool 900 of FIG. 9, that do not provide for through-housing access to the shaft. The wireless monitoring system should still provide for direct monitoring capabilities of the cutting tool operating conditions, such as temperature, vibration, rotational speed, etc.

The live tool 900 includes a shaft 902. The shaft 902 allows the live tool 900 to connect to a machining center (FIG. 1). The shaft 902 may pass through several segments of a live tool body 904, 906, 907 of varying and successively smaller diameter. The live tool 900 has a smaller diameter towards the cutting end to enable better access to the cutting area. The second live tool body segment 906 is between the first live tool body segment 904 and the third live tool body segment 907 of the illustrated embodiment. In the exemplified case, the first segment 904 is closer to the shaft end of the live tool 900. The second segment 906 is in between the first and third segments 904, 907, and the third segment is closest to the cutting tool 908. In other embodiments, each live tool body segment 904, 906, and 907 may have a substantially similar diameter. The cutting tool 908 may be operably connected to the shaft 902 with a collet (not shown).

The live tool 900 may include a transmitter unit 910 having a housing with transmitter components, including a power unit, protected inside. The transmitter unit 910 is configured to transmit data to a receiver (e.g. 170 of FIG. 3). In an embodiment, the transmitter unit 910 is a transceiver unit. In an embodiment, the transmitter unit 910 includes computing and/or processing capabilities. As an example, the transmitter unit 910 may include the following elements illustrated in FIG. 5: antenna 268, transmission unit 266, power source 262 and processor 264. The transmitter unit 910 may be mounted to the live tool body (e.g. segment 904) with a transmitter connector band 920. There are numerous other methods, known in the art, of mounting auxiliary structures to live tools or related components. In an embodiment, the live tool 900 has at least one feature, such as a cavity (see FIG. 1B), a slot, a flat, or a screw thread, that can be used to connect the transmitter unit 910 to the live tool. In each embodiment the live tool 900 does not have to provide for optical access directly between the transmitter unit and the inside of the body 904.

In some embodiments, the transmitter unit 910 uses a cable 930 to connect to a remotely positioned sensor collar 950. The sensor collar 950 is designed to at least partially surround a rotating portion of the live tool 900 to be capable of monitoring operating conditions adjacent to the cutting tool 908 without dedicated access built into the live tool 900. The cable 930 can include wiring to transmit power to a sensor within the sensor collar 950 and data from the sensor to the transmitter unit 910. In one embodiment, a bracket system 940 may be employed to support the cable 930 and/or support the sensor collar 950 upon the live tool 900. The bracket system 940 may include a connector arm 942 designed to hinge around an axis, exemplified by joint 946, and provide flexibility in the bracket assembly process. A bracket band 944 may be connected to the live tool body 904. The connector arm 942 may then extend from the bracket band 944 to the sensor collar 950. The bracket band 944 may be mounted to a segment of the live tool body 906 different from the segments 904, 907 on which the sensor collar 950 and connector band 920 are located.

In one example, the sensor collar 950 secures the collet (see FIG. 10B) that holds the cutting tool 908. Therefore the sensor collar 950 may be referred to in the industry as a a collet chuck lock nut, such as a Rego fix, a ER lock nut, an ER collet nut, etc. As such, a sensor could be embedded or otherwise provided in a standard body configuration to maintain the functionality and similarly mirror the dimensions of the part (e.g. a ER lock nut) being replaced. For example, the outer diameter range may be between 15-80 mm, more specifically, between 15-20 mm, 20-30 mm, 25-35 mm, 35-50 mm, 50-65 mm, or 60-80 mm. The sensor collar may have a length within the range of about 10-30 mm, more specifically, between about 11-20 mm, or between about 19-30 mm. The sensor collar 950 may be sized to fit ER standards, such as ER11, ER16, ER20, ER25, ER32, ER40, ER50, etc.

The sensor collar 950 may include a cavity 952 in which one or more sensors can be mounted or supported within. The cavity 952 may be shaped to position and secure a collet therein. In some embodiments, the sensor collar 950 includes multiple cavities 952 in which multiple sensors can be mounted. The sensor collar 950 may include slots 954, or similar features, by which a tool can be used to tighten and secure and/or untighten the sensor collar relative to the cutting tool 908 or the shaft 902. Additional features of the sensor collar 950 include an exterior surface 956, a tool end distal surface 957, and a radial interior surface 958. Thus, the sensor collar 950 has a generally annular shape suitable for at least partially surrounding the cutting tool 908 or the shaft 902. In some cases the annular shape would be sufficient if it curved only partially around a complete circle. If the sensor collar 950 does not replace a lock nut or similar component, the sensor collar 950 may be a separate element mounted to the housing body 907 by such a locking nut.

The sensor collar 950 may house the one or more sensors, and may also house other electrical components in the same annular unit. In an embodiment, electrical traces or wiring are mounted on or within the sensor collar 950. In an embodiment, sensor collar 950 is or includes a printed circuit board.

In other embodiments, the sensors are mounted on, within or integrated with a collet, or a nut system that secures the collet. Typically, the nut system including seals, gaskets, rings and components that are in direct contact with the nut while it is securing the collet in place. In an embodiment, the nut system including components that are placed between the nut and the live tool body 904 such as seals, gaskets, rings, annular shaped or partially annular shaped components.

The one or more sensors may be configured to monitor a variety of operating conditions of the live tool 900. In an embodiment, the sensor may be a speed sensor configured to sense the velocity, or changes therein, of the cutting tool 908 while it is rotating. A change in tool rotational speed, in general, or during various trajectories, may be indicative of tool wear and/or of changes in the cutting process.

In an embodiment, the sensor can sense the vibration of the cutting tool 908 in free air and during the machining process. Use of a vibration sensor may allow for a computation or estimation of the rotational speed of the cutting tool 908 without requiring the presence of an optically or magnetically identifiable mark as used by optical and Hall effect sensors. This adds to the ability for the wireless monitoring system to be applied to existing live tools. In an embodiment a piezo electric sensor (e.g. SEN-09198 ROHS or SEN-09196 ROHS) that can measure flex, touch, vibration and shock measurements is mounted on the collar exterior surface 956, or in the cavity 952. In an embodiment, a MEMS based accelerometer (such as iSensor® MEMS from Analog Devices) is mounted on the collar exterior surface 956 or in cavity 952. In an embodiment, the flex and touch features may indicate contact or disengagement of the cutting tool with the work piece. In an embodiment, measurement of the vibration frequency and/or amplitude may be indicative of the cutting process quality. In an embodiment, measurement of the vibration frequency and/or amplitude may be indicative of and correlated to the tool rotational velocity. In an embodiment, a shock signal may be indicative of a hardware problem, such as tool breakage or uncontrolled movement of the work piece.

In an embodiment, the sensor is a temperature sensor (e.g. Miniature and Micro Thermistors from QTI Sensing Solutions) configured to sense the temperature of the cutting tool 908 in free air and during the machining process in close proximity to the tool end. Monitoring temperature is worthwhile because an increase in tool temperature may be indicative of tool wear and/or of changes in the cutting process. Sensing temperature can be highly indicative of a pending problem with the cutting process. In an embodiment, the temperature sensor is mounted on the exterior surface 956 of the collar, such that it can sense the cutting environment. In an embodiment, the temperature sensor is mounted in cavity 952 such that it can sense the temperature of the cutting tool during the cutting process. Further, use of a temperature sensor does not require modification to the cutting tool 908 or the shaft 902. Therefore a temperature sensor is both highly useful for monitoring of the live tool while also promoting the ability to retrofit existing live tools.

According to the present disclosure, the live tool 900 is configured for monitoring the cutting tool 908, or the shaft 902, directly, at the cutting site, e.g. at the cutting tool or collet. Being "at the cutting site" may mean at the tool end, within a distance of between 1-5 mm, or between 5-10 mm, or between 10-20 mm, or between 20-40 mm. Direct monitoring of the cutting tool 908 includes direct monitoring of the collet that secures the cutting tool and includes directly monitoring the nut that secures the collet. Direct monitoring of the cutting tool 908 also includes direct monitoring of the shaft 902. The close proximity to the cutting tool 908 limits the potential for interference caused by cooling fluid or mist that can hinder accuracy if the cutting tool 908 were monitored from afar. The transmitter unit 910 provides for wireless communication between the sensor and a control unit of the machine center.

Use of wireless communication allows the live tool 900 to remain compatible with automated tool changers (ATC) for being automatically loaded and unloaded. Additionally, the transmitter unit 910 and the sensor collar 950 should be small enough such that they do not compromise the machining process and/or loading and unloading of the live tool 900 from the ATC.

In many embodiments, the controller of the machine center is configured to accept the signal or data from the one or more sensors and use that information within a feedback loop to adjust at least one function of the machining center in response to the information related to at least one operating condition received by the wireless receiver. The adjustments may include adjustments to increase or decrease cutting tool velocity, adjustments to terminate the cutting process, or adjustments to regulate access to the machining center.

Turning now to FIGS. 10A and 10B, another live tool 1000, in this case a mechanical live tool, is shown. FIG. 10B is an exploded view of the live tool 1000. The live tool 1000 is provided with a sensor collar 1050 and a transmitter unit 1010 similar to those discussed above with respect to FIG. 9. The wireless monitoring system (e.g. the combination of the transmitter unit 1010 and the sensor collar 1050) is applied to the mechanical live tool 1000 without substantial modifications thereto. The live tool 1000 may include a shaft 1002, a live tool body 1004, and a transmitter unit 1010. The live tool body 1004 may have flat surfaces 1015 for engagement by a tool that can be used to mount or dismount the live tool 1000 from the machining center. The live tool body 1004 may also include a threaded portion 1018 for receiving a collar system 1050. The collar system 1050 may be configured to secure a collet 1020 to the live tool body 1004.

In an embodiment, the collar system includes an annular shaped PCB 1060, on which sensor elements 1062 are mounted on or within. In an embodiment, the sensor elements 1062 are temperature sensors (such as Miniature and Micro Thermistors from QTI Sensing Solutions). In an embodiment, the sensor elements 1062 are accelerometers to sense vibration, for example Memes based accelerometers (such as iSensor® MEMS from Analog Devices) or piezo electric based sensors (e.g. SEN-09198 ROHS or SEN-09196 ROHS). In an embodiment, the sensor elements 1062 are temperature sensors. In an embodiment the sensor elements 1062 are position and/or velocity sensors that function based on optical or magnetic principles, in which case the cutting tool would have corresponding features such as an optical marking, a physical feature such as a hole or electromagnetic properties, e.g. a magnet. Other types of sensors discussed in the embodiments above may also be included additionally or alternatively.

In an embodiment, the sensor elements 1062 are powered from an energy storage unit, for example a capacitor or battery, provided within the collar 1050 or the transmitter unit 1010. In an embodiment, the collar system 1050 may have a contact point by which the collar system can electrically connect to a reciprocal electrical contact unit when the live tool 1000 is in the ATC. The reciprocal electrical contact unit may be connected to a power source, e.g. to a battery or to the machining center unit power.

The collar system 1050 may include a flange 1052, slots 1054, or similar features by which a tool can be used to tighten and secure and/or untighten the collar system 1050. Other features of the collar system 1050 may include an exterior surface 1056 and a radial interior surface 1058. In an embodiment, the collar system 1050 includes at least one seal 1070 or gasket that is placed on either side of the annular PCB 1060. Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A wireless monitoring kit for mounting to a live tool, comprising:
a collar configured to mount to the live tool such that the collar at least partially surrounds a rotating shaft of the live tool or a rotating cutting tool of the live tool, the collar comprising at least one sensor capable of monitoring an operating condition proximate to the cutting tool and during a cutting operation;
the collar being a collet chuck lock nut;
a transmitter unit comprising a wireless transmitter in communication with the at least one sensor for transmitting a signal for use by a machining center controller; and
a power source.

2. The kit of claim 1, wherein the at least one sensor is a temperature sensor and the operating condition comprises the temperature adjacent to the cutting tool.

3. The kit of claim 2, further comprising:
a wireless receiver capable of receiving signals sent from the wireless transmitter; and
a controller connector for operably connecting the wireless receiver to the machining center controller,
wherein the controller connector is configured to relay temperature information to the machine center controller for adjusting at least one function of the machining center in response to the temperature information.

4. The kit of claim 1, wherein the at least one sensor is a vibration sensor and the operating condition comprises vibration caused by the rotation and cutting operation of the cutting tool.

5. The kit of claim 1, wherein the collet chuck lock nut is a locking nut used to secure the cutting tool to the live tool.

6. The kit of claim 5, wherein the collar includes slots by which a tool can be used to tighten and untighten the collar relative to the cutting tool or the shaft.

7. The kit of claim 1, wherein the at least one sensor comprises a plurality of sensors.

8. The kit of claim 7, wherein the collar includes a plurality of cavities, each for receiving a respective one of the sensors.

9. The kit of claim 1, further comprising a bracket band for supporting the collar on the live tool.

10. The kit of claim 1, further comprising a transmitter connector band for connecting the wireless transmitter to the live tool.

11. The kit of claim 1, wherein:
the transmitter unit is mountable on the live tool at a location remote from the collar; and
the kit further comprises a cable for connecting the wireless transmitter unit to the collar.

12. The kit of claim 1, wherein the power source is located in the transmitter unit.

13. The kit of claim 12, wherein the transmitter unit further comprise a processor.

14. The kit of claim 1, wherein the collar includes at least one cavity within which the at least one sensor is mounted and/or supported.

15. The kit of claim 1, wherein the transmitter unit comprises an antenna.

16. A live tool system comprising, in combination:
the live tool, said live tool having at least one of the rotating shaft and the rotating cutting tool; and
the wireless monitoring kit of claim 1; wherein:
the collar at least partially surrounds the rotating shaft or the rotating cutting tool; and
the wireless transmitter is in communication with the at least one sensor for transmitting a signal for use by the machining center controller.

17. The live tool system of claim 16, wherein the live tool is a fluid drive live tool.

18. The live tool system of claim 16, wherein the cutting tool is a mechanical cutting tool.

19. The live tool system of claim 16, wherein the at least one sensor is able to be retrofitted to the live tool without modification to the shaft or the cutting tool.

20. A method of monitoring a live tool, comprising:
providing the wireless monitoring kit of claim 1;
mounting the collar around at least one of the cutting tool, a collet, and the shaft of the live tool, the collar comprising the at least one sensor;
mounting the wireless transmitter unit to the live tool, the wireless transmitter unit in communication with the at least one sensor; and
sensing, using the at least one sensor, the operating condition during a cutting operation using the cutting tool;
transmitting a signal representative of the sensed operating condition to a wireless receiver in communication with the machining center controller; and
adjusting or terminating operation of the live tool when a predetermined sensed operating condition is detected.

* * * * *